United States Patent [19]

Young

[11] Patent Number: 4,725,018
[45] Date of Patent: Feb. 16, 1988

[54] REVERSIBLE DRIVE FISHING REEL

[76] Inventor: John N. Young, 35 Berry Trail, Fairfax, Calif. 94930

[21] Appl. No.: 34,733

[22] Filed: Apr. 6, 1987

[51] Int. Cl.$^4$ .............................................. A01K 89/01
[52] U.S. Cl. ............................... 242/217; 242/84.2 R
[58] Field of Search .............. 242/84.1 J, 211, 217, 242/218, 219, 84.5 A, 84.53, 84.1 R, 84.2 R, 84.21 R

[56] References Cited

U.S. PATENT DOCUMENTS

| | | | |
|---|---|---|---|
| 2,863,617 | 12/1958 | Chapin et al. | 242/84.5 H X |
| 3,946,963 | 3/1976 | Oberg | 242/84.51 A X |
| 4,196,867 | 4/1980 | Miller | 242/84.1 J |
| 4,369,930 | 1/1983 | Noda | 242/84.1 J |
| 4,463,914 | 8/1984 | Puryear | 242/84.1 J |
| 4,572,455 | 2/1986 | Noda | 242/84.1 R |
| 4,674,698 | 6/1987 | Carpenter | 242/84.5 A X |

Primary Examiner—Stuart S. Levy
Assistant Examiner—Joseph J. Hail, III
Attorney, Agent, or Firm—Melvin R. Stidham

[57] ABSTRACT

In a drive mechanism for a fishing reel in which the drive shaft has a radial drive wheel intermediate its ends. Straddling the drive wheel are rotatable discs carrying a main gear, and outboard of the radial discs are drive flanges carried on plunger sleeves. The plunger sleeves are axially slidable on the drive shaft but rotate therewith. The main drive shaft is threaded at both ends so that a drag adjustment nut may be threaded onto either end to push one of the plunger sleeves axially and compress friction washers between the main drive wheel and a plunger sleeve drive flange against opposite sides of one of the driven discs carrying the main gear.

8 Claims, 2 Drawing Figures

REVERSIBLE DRIVE FISHING REEL

BACKGROUND OF THE INVENTION

Generally, a fishing reel includes a drive shaft, which is rotatably mounted between side members and driven by operation of a crank or handle mounted at one end of the drive shaft. The drive shaft customarily carries a main gear that drives a pinion on a spool shaft, or on a shaft carrying a bail mechanism for rewinding a fishing line. Also carried on many fishing reels on the end of the drive shaft adjacent the crank is a drag adjustment nut or star wheel that enables the fisherman to adjust the amount of pull on the line that will be withstood by the reel before the spool yields to be as rotated in reverse by pull on the line.

Fishing reels are generally manufactured for operation by right-handed fishermen and, a left-handed angler operates the conventional fishing reel only with considerable difficulty, unless he can find a fishing reel with the handle and drag adjustment on the opposite end of the shaft.

A fishing reel with a reversible, right-hand or left-hand crank is shown in Noda U.S. Pat. No. 4,572,455, granted Feb. 25, 1986.

OBJECTS OF THE INVENTION

It is an object of this invention to provide a fishing reel that can easily be converted from right-hand to left-hand operation.

It is a further object of this invention to provide a fishing reel wherein both the handle and the drag control mechanism may easily be transferred from the right side to the left side of the reel.

Other objects and advantages of this invention will become apparent from the description to follow, particularly when read in conjunction with the accompanying drawings.

SUMMARY OF THE INVENTION

The fishing reel of this invention includes a drive shaft that has an integral driving flange or wheel intermediate the ends thereof. Slidably received on opposite ends of the drive shaft to rotate therewith are plunger sleeves that have drive flanges on the inboard ends thereof, each directed toward one side of the main driving flange or wheel on the drive shaft. The plunger sleeves are carried in rotary bushings on the fishing reel body so that, as the drive shaft is rotated, the plunger sleeves rotate with it.

A first driven disc, which is integral with the main gear, and a second driven disc, which is locked to the main gear, are both rotatable and slidable on the drive shaft on opposite sides of the drive shaft driving flange or wheel. Friction washers are disposed between opposite sides of the drive shaft driving wheel and the inboard sides of the driven discs and between the plunger sleeve drive flanges and the outboard sides of the driven discs. The drive shaft is threaded at both ends so that the drag star adjustment and the handle may be applied to either end of the shaft. On whichever end of the drive shaft the drag star is threaded, it may be tightened to force the adjacent plunger sleeve inboard and compress the friction washers on opposite sides of the adjacent drive disc between the drive wheel and plunger sleeve drive flange.

DESCRIPTION OF A PREFERRED EMBODIMENT

Figure 1:
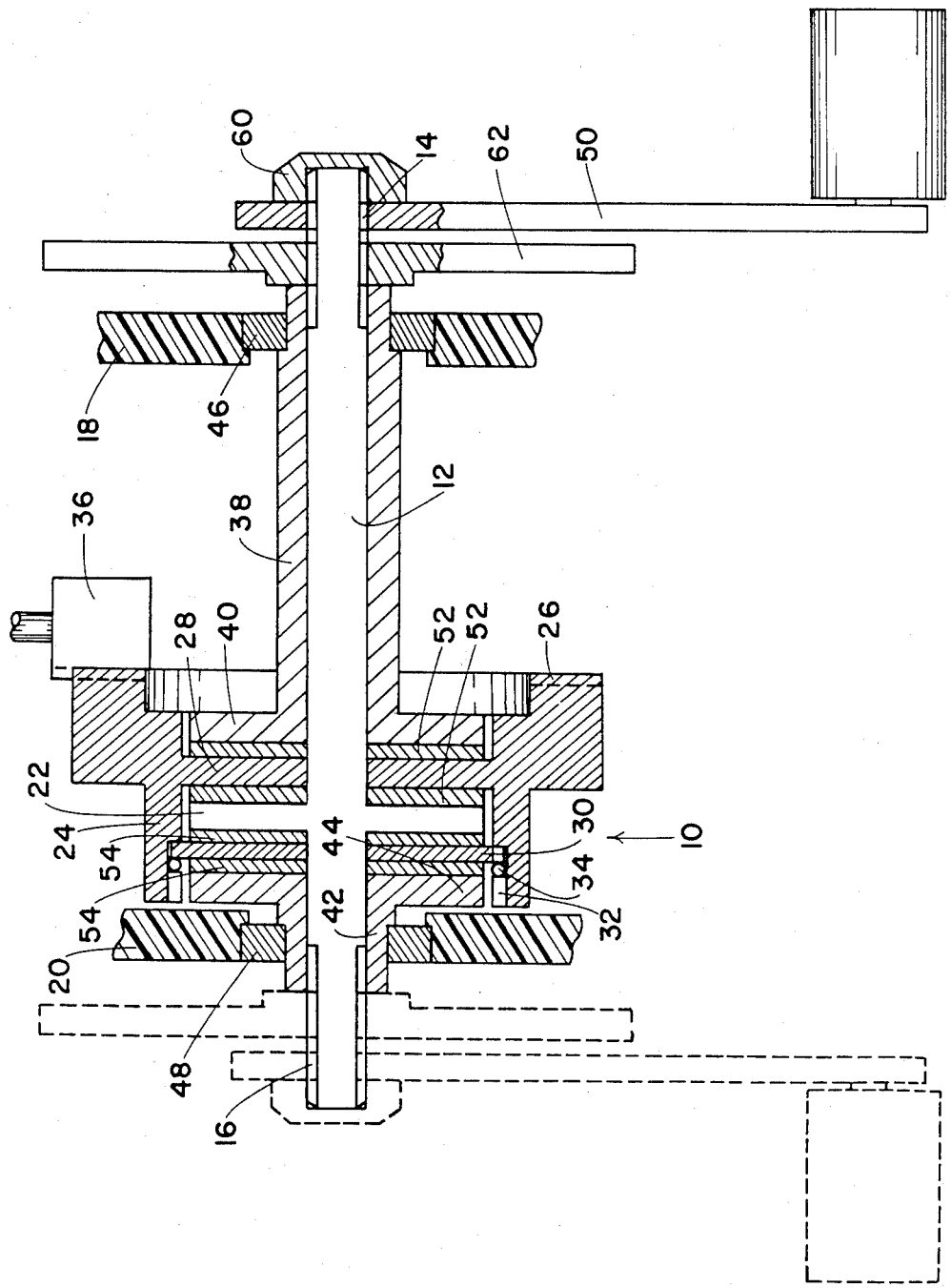
FIG. 1 is a section view taken through a fishing reel embodying features of this invention.
Figure 2:
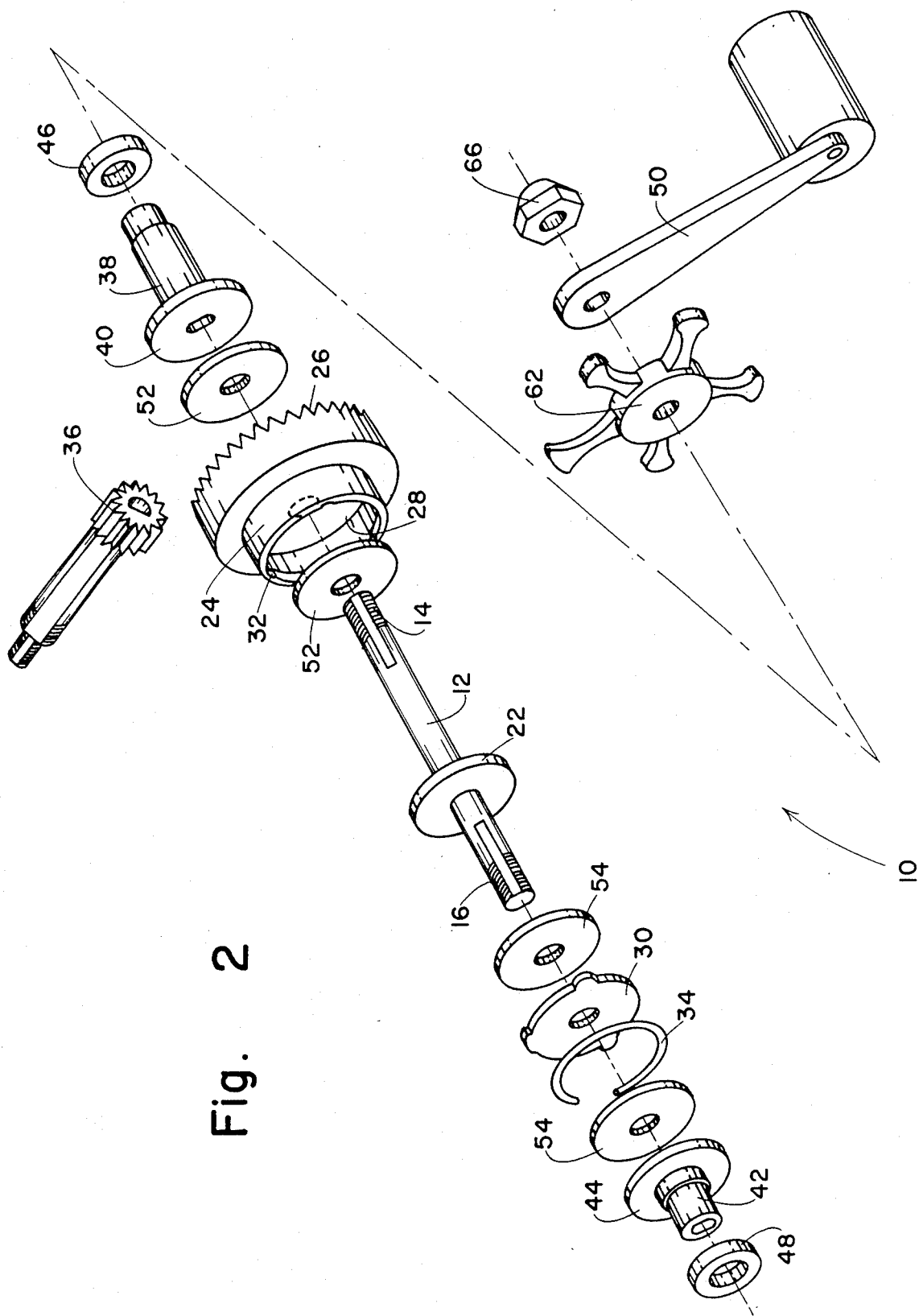
FIG. 2 is an exploded view showing the components of the drive system.

Referring now to the drawings with greater particularity, the reversible fishing reel drive 10 of this invention includes a drive shaft 12, the threaded ends 14 and 16 of which extend beyond the side walls 18 and 20 of the fishing reel body. Integral with the drive shaft and intermediate the ends thereof is a driving flange or wheel 22.

The main drive wheel 22 is carried within a driven drum 24, on which is carried the main gear 26. A first driven disc 28 which is integral with the main gear drum 24, is slidable and rotatable on the main drive shaft on one side of the main drive wheel 22. On the other side of the main drive wheel 22 is an earred disc 30 that is also slidable and rotatable on the main drive shaft 12. The earred disc 30 is inserted into the main gear drum 24 through recesses 32 and secured in place by a spring clip 34 so that it rotates with the main drive drum 24. The main gear 26 meshes with and drives a pinion gear 36.

Slidably carried on one end of the main drive shaft 12 but rotatable therewith is a right-hand plunger sleeve 38 with an integral drive flange 40. Slidably carried on the opposite end of the drive shaft 12 is a left-hand plunger sleeve 42 with an integral drive flange 44.

The plunger sleeves 38 and 42 are rotatably mounted in bushings 46 and 48 carried on the reel body side walls 18 and 20 so that, as the handle or crank 50 is turned by the angler, the drive shaft 12 and plunger sleeves 38 and 42 rotate as a unit in the bushings 46 and 48. Right-hand friction washers 52 are interposed between the drive shaft drive wheel 22 and the inboard side of the first driven disc 28 and between the outboard side of the first driven disc 28 and the right-hand plunger sleeve drive flange 40. Similarly, left-hand friction washers 54 are interposed between the drive shaft drive wheel 22 and the inboard side of the earred disc 30 and between the outboard side of the earred disc 30 and the left-hand plunger sleeve flange 44.

On whichever end of the drive shaft 12 the crank 50 is positioned and locked in place by a nut 60, a star-wheel 62 is threaded onto the drive shaft 12 to engage the end of the adjacent plunger sleeve 38 or 42. With the star wheel 62 on the right side as shown in full lines, tightening of the star wheel will squeeze the friction washers 52 between the first driven disc 28 of the main gear wheel 24 and the main drive wheel 22 and between the first driven disc and the drive flange 40 to increase the amount of pull that can be taken by the line (not shown) before there is any slippage between the main gear wheel or drum 24 and the drive shaft 12.

Similarly, with the crank 50 and star wheel 62 placed on the left, as shown in phantom, tightening of the star wheel will increase the compressive forces on the drag stack 54, 30, 54 between the main driving wheel 22 and the drive flange 44 of the plunger sleeve 42 to squeeze the friction washers 54 and increase the amount of drag between the earred disc 30 and the drive shaft 12.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A drive mechanism for a fishing reel comprising:
   a reel body;
   a drive shaft extending through opposite sides of said reel body;
   a radial driving wheel fixed to said drive shaft intermediate the ends thereof;
   an annular driven member around said radial driving wheel;
   a pair of driven discs carrying said annular drive member rotatable on said drive shaft;
   said driven discs being positioned on opposite sides of said radial driving wheel;
   first and second plunger sleeves slidable on said drive shaft to rotate therewith on outboard sides of said drive discs;
   radial drive flanges fixed on inboard ends of said plunger sleeves;
   outboard ends of said plunger sleeves being rotatably and slidably mounted in said opposite sides of the body;
   friction washers rotatable and slidable on said drive shaft interposed between each of said drive flanges and an outboard side of one of said driven discs;
   male threads on both ends of said drive shaft;
   a drag adjustment member threadedly received on either end of said drive shaft to engage and apply an axial force against the outboard end of one of said plunger sleeves; and
   a handle slidably received on either end of said drive shaft to rotate said drive shaft.

2. A drive mechanism for a fishing reel as defined by claim 1 including:
   friction washers rotatable and slidable on said drive shaft interposed between each side of said radial driving wheel and a inboard side of one of said drive discs.

3. A drive mechanism for a fishing reel as defined by claim 1 wherein: said annular drive member is a main gear.

4. A drive mechanism for a fishing reel as defined by claim 1 wherein: one of said drive discs is removably from said annular drive member.

5. A drive mechanism for a fishing reel comprising:
   a reel body;
   a drive shaft extending through opposite sides of said reel body;
   a radial driving wheel fixed to said drive shaft intermediate ends thereof;
   an annular driven member around said radial driving wheel;
   a pair of driven discs carrying said annular driven member rotatable on said drive shaft;
   said driven discs being positioned on opposite sides of said radial driving wheel;
   first and second plunger sleeves slidable on said drive shaft to rotate therewith on outboard sides of said driven discs;
   a first drag stack assembly including said first plunger sleeve, said radial driving wheel and one of said driven discs;
   a second drag stack assembly including said second plunger sleeve, said radial drive wheel and the other of said drive discs;
   male threads on both ends of said drive shaft;
   a drag adjustment member threadedly received on either end of said drive shaft to engage and apply an axial force against an outboard end of one of said plunger sleeves; and
   a crank slidably received on either end of said drive shaft to rotate said drive shaft.

6. A drive mechanism for a fishing reel as defined by claim 5 wherein: said annular drive member is a main gear.

7. A drive mechanism for a fishing reel comprising:
   a reel body;
   a drive shaft extending through opposite sides of said reel body;
   a radial driving wheel fixed to said drive shaft intermediate ends thereof;
   an annular driven member around said radial driving wheel;
   a pair of axially spaced, radially inward extensions on said driven member straddling said radial driving wheel;
   first and second plunger sleeves slidable on said drive shaft to rotate therewith on outboard sides of said radially inward extensions;
   radial drive flanges fixed on inboard ends of said plunger sleeves;
   outboard ends of said plunger sleeves being rotatably and slidably mounted in said opposite sides of the body;
   first friction washers rotatable and slidable on said drive shaft interposed between one of said radial drive flanges and an outboard side of one of said radially inward extensions and between an inboard side of said one radially inward extension and said driving wheel;
   second friction washers rotatable and slidable on said drive shaft interposed between the other of said drive flanges and an outboard side of the other of said inward extensions and between an inboard side of said other inward extension and said driving wheel;
   male threads on both ends of said drive shaft;
   a drag adjustment member threadedly received on either end of said drive shaft to engage and apply an axial force against the outboard end of one of said plunger sleeves; and
   a handle slidably received on either end of said drive shaft to rotate said drive shaft.

8. A drive mechanism for a fishing reel as defined by claim 7 wherein: said annular drive member is a main gear.

* * * * *